United States Patent
Gathright

(10) Patent No.: US 7,570,758 B2
(45) Date of Patent: Aug. 4, 2009

(54) PROTECTIVE SLEEVE FOR TELEPHONE HANDSETS

(76) Inventor: Czell Gathright, Los Angeles, CA (US);
Harlan Gathright, legal representative, 4351 Jade Ave., Cypress, GA (US) 90630

( * ) Notice: Subject to any disclaimer, the term of this patent is extended or adjusted under 35 U.S.C. 154(b) by 583 days.

(21) Appl. No.: 11/314,906

(22) Filed: Dec. 21, 2005

(65) Prior Publication Data

US 2007/0140476 A1   Jun. 21, 2007

(51) Int. Cl.
*H04M 1/00*   (2006.01)
*H04M 9/00*   (2006.01)
(52) U.S. Cl. .................. 379/452; 379/439
(58) Field of Classification Search ........... 379/433.11, 379/437, 439, 451–452; D14/192, 138, 250, D14/217
See application file for complete search history.

(56) References Cited

U.S. PATENT DOCUMENTS

| 4,071,040 | A | * | 1/1978 | Moriarty | 137/199 |
| 4,953,567 | A | * | 9/1990 | Ward | 128/851 |
| 4,964,161 | A | * | 10/1990 | Trowbridge, Jr. | 379/452 |
| 5,012,513 | A | * | 4/1991 | Dale et al. | 379/451 |
| 5,862,215 | A | * | 1/1999 | Garriette | 379/452 |
| 2007/0098148 | A1 | * | 5/2007 | Sherman | 379/452 |

* cited by examiner

*Primary Examiner*—Curtis Kuntz
*Assistant Examiner*—Phylesha Dabney
(74) *Attorney, Agent, or Firm*—Christina S. Loza; Loza & Loza, LLP

(57) ABSTRACT

A lightweight disposable shield which is capable of fitting over the handset of a telephone for isolating the user of the handset from bacteria or other microbes on the handset. The shield is in the nature of a sleeve which slips over the handset from an end thereof and which does not have a cord or tie connected at that end to tighten the shield on the handset.

11 Claims, 1 Drawing Sheet

PROTECTIVE SLEEVE FOR TELEPHONE HANDSETS

BACKGROUND OF THE INVENTION

1. Field of the Invention

This invention relates in general to certain new and useful improvements in protective shields for telephone handsets, and more particularly, to a readily usable and removable and disposable shield capable of sliding disposition over the handset of a telephone to isolate the user from microbes collecting on the mouthpiece or other portions of that telephone handset.

2. Brief Description of Related Art

Public telephones are frequently located in many, if not most, commercial institutions and operate by mere insertion of coins or paper currency into the telephone to initiate a telephone call. The relatively low cost to operate and use a public telephone coupled with the wide availability of the phones, leads to a substantial population which uses these phones.

Many of the users of these public telephones have infectious diseases of one type or another and the microbes which cause the disease or result from the disease are often contagious and can be transmitted to another individual and particularly, another user of that telephone handset. These microbes are transferred to the telephone, frequently by inadvertent contact of the lips of the user with the mouthpiece of the handset or otherwise, even from the breath of the user. In addition, the microbes can be transferred to the handset through any moisture carried in the exhaled air and thereby allowed to collect on the mouthpiece of the handset.

Although the problem of disease transmittal through public telephone handsets is widespread, little or no action has been taken, particularly by the public telephone companies, to eliminate this problem. There have been several proposals to destroy the microbes which might collect on the telephone handset. One proposal resided in the use of radiation to be applied to the handset and particularly the mouthpiece of the public telephone. However, these means for destroying the microbes also present deleterious effects to the users of the public telephones. Moreover, they were expensive, cumbersome and not easily adaptable for use with public telephones.

The problem with microbe collection and contagious disease transmittal is not only limited to public telephones per se, but to private telephones as well, which are used by numerous parties. Here again, there has been little or no effort directed toward the elimination if not the reduction of this particular problem.

It would be desirable to provide a shield in the nature of an envelope or sleeve adapted to removably extend over the handset of a telephone and which also permitted voice transmission through the sleeve or envelope to thereby permit voice transmission but to preclude microbe transmission to the user, and which also could be made in disposable form.

OBJECTS OF THE INVENTION

It is, therefore, one of the primary objects of the present invention to provide a sleeve adapted to extend over the handset of a telephone for isolating a user of the handset from microbe contamination on the handset and which sleeve is easily inserted onto the handset and removable therefrom.

It is another object of the present invention to provide a protective sleeve of the type stated which can be constructed at a low unit cost and which is therefore readily disposable.

It is a further object of the present invention to provide a protective sleeve of the type stated which can be formed of a very thin plastic sufficient to preclude microbial transmission to the user of the handset, but which also is sufficient to enable voice transmission through the protective sleeve.

It is an additional object of the present invention to provide a package of the aforesaid protective sleeves, so that they are disposable after use and where the user can thereupon select a new protective sleeve for use on a telephone handset at another occasion.

It is another salient object of the present invention to provide a method of protecting a user of a telephone handset from microbial contamination resulting from the use of that telephone handset by insertion of a plastic sleeve over the handset to isolate the user from such microbial contamination, but which allows voice communication therethrough.

It is another important object of the present invention to provide a method of the type stated which involves the insertion of a protective sleeve over a telephone and which provides for easy removal of the protective sleeve from the telephone handset after use thereof.

With the above and other objects in view, my invention resides in the novel features that form, construction, arrangement and combination of parts and components presently described and pointed out in the claims.

BRIEF SUMMARY OF THE INVENTION

A protective sleeve for removable disposition over a handset of a telephone. The protective sleeve is preferably formed of a lightweight, relatively thin plastic material which effectively insulates the user of the telephone handset from any microbial contamination on the handset and particularly the mouthpiece thereof, but which also allows voice transmission therethrough.

The protective sleeve is formed in the shape of an elongated tube having a size sufficient to extend over a telephone handset, and is also provided with at least one open transverse end such that the sleeve can be extended over the handset of the telephone.

The protective sleeve of the invention is preferably, although not necessarily formed, of a transparent material such as polyethylene or the like, so that a user can readily observe and thereby easily install the protective sleeve on a handset of a telephone. It has been found in connection with the present invention that there is no need for, and in fact it is even desirable to avoid use of, an elastic band around the one transverse open end which receives an end of the handset that does not have a telephone cord connected thereto.

Most telephone handsets are usually connected to the remaining portion of a telephone and particularly a public telephone by a cord. Moreover, that cord frequently extends from an area in proximity to the mouthpiece of the handset and the earpiece is generally free and unencumbered. Accordingly, the protective sleeve is normally adapted to extend over the handset of the telephone from the earpiece and not the speaker, and then slid over the length of the handset and over the mouthpiece or microphone thereof. Regardless of the actual construction of the handset, the protective sleeve of the present invention can be slid over the handset from either end thereof.

The sleeve has a general shape somewhat roughly conforming to that of the handset. In other words, the sleeve has a slight arcuate shape to it. However, it has been found in connection with the present invention that it is not necessary to literally form a cup-like projection on either end to receive either the earpiece or the mouthpiece of that handset.

This invention possesses many other advantages and has other purposes which may be made more clearly apparent from a consideration of the forms in which it may be embodied. These forms are shown in the drawings forming a part of and accompanying the present specification. They will now be described in some detail for purposes of illustrating the general principles of the invention.

BRIEF DESCRIPTION OF THE DRAWINGS

Figure 1:
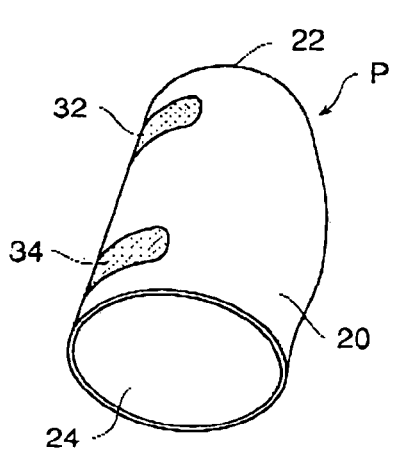
Figure 2:
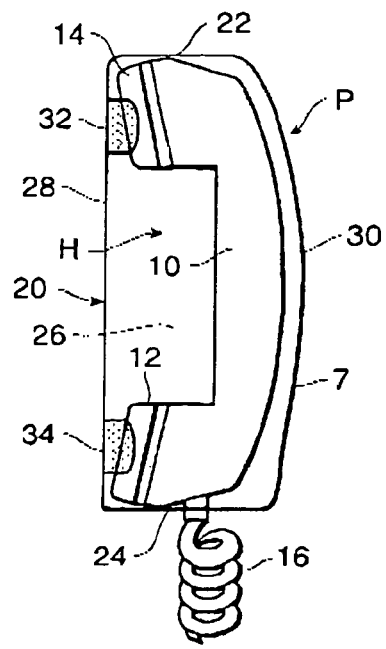
Figure 3:
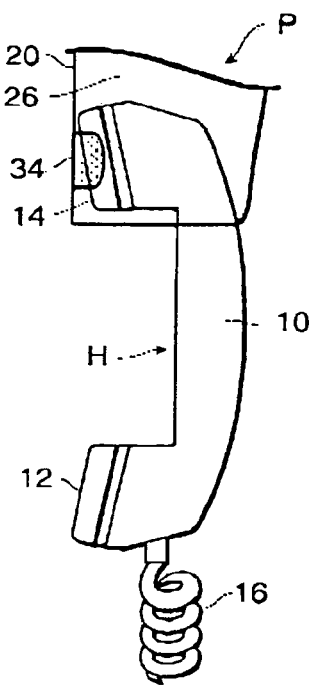
Figure 4:
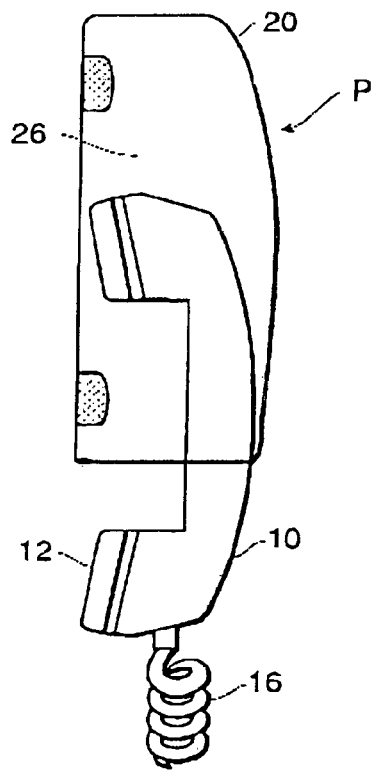
Figure 5:
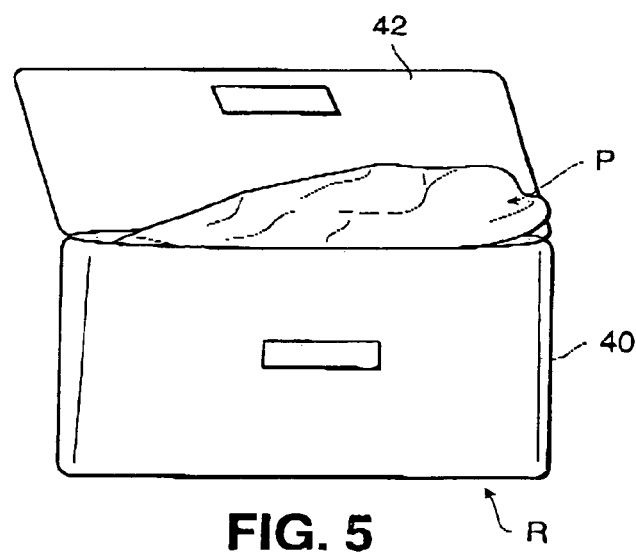

Having thus described the invention in general terms, reference will now be made to the accompanying drawings in which:

FIG. 1 is a prospective view, partially broken away of a protective sleeve adapted to fit over the handset of a telephone in accordance with the present invention;

FIG. 2 is a side elevational view showing the insertion of a protective sleeve of the invention over a handset of a telephone;

FIG. 3 is side elevational view, similar to FIG. 2, and is showing a protective sleeve of the invention completely installed over a speaker forming part of the handset of a telephone;

FIG. 4 is a side elevational view, similar to FIGS. 2 and 3 and showing the protective sleeve over a substantial portion of, but not including, the microphone of a telephone handset;

FIG. 5 is a prospective view of a package for the protective sleeves in accordance with the present invention.

DETAILED DESCRIPTION OF A PREFERRED EMBODIMENT

Referring now in more detail and by reference characters to the drawings, which illustrate a preferred embodiment of the present invention, "P" designates a protective sleeve or shield which is adapted for disposition over a handset of a conventional telephone and particularly a pay telephone. In this case, the handset is generally characterized by an elongate slightly arcuate handle 10 with a cup-like projection 12 functioning as the mouthpiece at one end of the handle 10 and another cup-like projection 14 at the opposite end of the handle and functioning as an earpiece.

Conventionally, the earpiece is often referred to as the speaker and the mouthpiece is often referred to as the microphone. A telephone cable 16 extends from the handset and in this case, from a point at the lower end of the mouthpiece 12. The telephone cable is usually, although not necessarily, fully enclosed within a protective cover. Moreover, the details of construction of the handset are not critical to the present invention and are therefore neither illustrated nor described in any further detail herein. For that matter, the details of construction of the so-called "call box" that is the main housing of the telephone is also neither illustrated nor described in any further detail herein.

The elongate protective sleeve P is in the nature of a sleeve 20 formed of a plastic material or other material which is light in weight, relatively flexible and bendable and foldable, and capable of being formed of a thin-skinned construction. For this purpose, plastic sleeves formed of low density polyethylene and polypropylene and the like are effective. Moreover, the plastic sleeve can be formed in any conventional plastic forming operation such as injection molding, blow molding, rotational molding, thermoforming, or the like. Again, the plastic material which is selected will, to some extent, determine the type of molding operation which may be used to form this protective sleeve.

In the formation of the protective sleeve, it is also possible to incorporate a bacteriostatic agent. As a simple example, sodium azide could be and is desirably effectively incorporated in the plastic raw material before the same is molded. In this way, the final article which is produced in the molding operation will present a bacteriostatic effect and thereby potentially destroy microbes such as bacteria which have collected on the mouthpiece or other portion of the telephone handset.

In a preferred embodiment as described herein, the protective sleeve P includes an elongate body 20 which has one closed transverse end 22 which would normally be located adjacent to the upper end of the handset near the earpiece 14. The lower end of the protective sleeve is provided with an opening 24, and which is adapted to receive and slide over the telephone handset H. In this respect, it can be observed that the sleeve is sized and shaped to readily and easily slide over the handset of a telephone so that it can be easily installed thereon and equally easy to remove therefrom.

It is noteworthy in accordance with the present invention and it has been found, that it is not necessary and in many cases not even desirable, to incorporate an elastic band around the open end of the protective sleeve P. An elastic band actually interferes with ease of installation and ease of removal and moreover, has been found not to be necessary in connection with the use of the protective sleeve. Moreover, the elastic band could actually militate against use because of the complications in installation.

Referring now in more detail to FIG. 1, it can be seen that the protective sleeve P forms a hollow interior 26 which is adapted to receive the handset of the telephone. The sleeve P also has one edge 28 when folded which is relatively straight, as shown in FIG. 2. The opposite edge has somewhat of an arcuate bend 30 in order to effectively conform to the overall shape of the handset of the telephone. Moreover, it can be observed that the closed end 22 similarly has somewhat of an arcuate shape. In this respect, the overall protective sleeve P and the preferred embodiment has somewhat of a foot sock. Thus, the sleeve P has somewhat of an arcuate shape to it.

It is, however, important in connection with the present invention to recognize that it is not necessary to shape the sleeve in this fashion. Rather, the sleeve could have a pair of straight forward and rearward margins when in the folded position. However, the embodiment as shown is actually the preferred embodiment.

The protective sleeve is made of a material which is relatively thin, such that voice sounds will carry through the actual skin of the sleeve and enable sound reception at both the earpiece and the mouthpiece of the telephone handset. However, in a preferred embodiment, the body 20 is provided with an open grid formed in the skin of the sleeve 32 near the earpiece and a similar grid 34 near the mouthpiece 12, thereby further facilitating sound transmission such as voice transmission. It should be understood, however, that other forms of openings in the sleeve and for that matter, even areas of reduced thickness, could be formed in the protective sleeve P adjacent the earpiece and the mouthpiece of the handset.

FIG. 3 illustrates the actual insertion of the protective sleeve P over the handset H of the telephone. In this case, it can be observed that the open end 24 is extended over the earpiece and partially over the upper portion of the hand grip of the handset. FIG. 4 shows the protective sleeve largely slid over most of the length of the telephone handset but not completely over the telephone handset. FIG. 2, however, illustrates the position of the sleeve with the handset fully disposed therein. It can be observed that removal of the handset is easy and convenient by merely pulling same off of the handset and then discarded after use.

It should be understood that the protective sleeve P of the invention could be provided in a permanent form for permanent installation over the handset of a telephone. Although such is available, it is far preferable to provide the protective sleeves P in a disposable form. Moreover, they can be easily and readily packaged for removal from a package therefor on an individual basis. One such package R is more fully illustrated in FIG. 5 of the drawings. It can be observed that the package R is essentially a conventional package having a pouch 40 and readily openable top 30 for removal of one or more of the protective sleeves.

The protective sleeve of the invention is preferably formed of a transparent material so that the handset can be observed when the protective sleeve is installed on the handset to thereby facilitate installation. However, it should be understood that the protective sleeve could be formed in any of a variety of colors. For that matter, the protective sleeve could be formed in a decorative decor. In addition, either the protective sleeve or the package therefor, or both, could be provided with a sponsor's identification, such as a sponsor's trademark, to allow the sponsor to provide a give-away disposable item.

The protective sleeve of the invention has a relatively thin-walled construction. In this way, the sleeve is light in weight and readily foldable and bendable and easily installed on a handset of a telephone. It is preferable to use a material thickness roughly, of about 0.30 mil. thickness. However, the thickness can range between 0.7 mil. to about 0.05 mil. thickness. Usually the thickness should not be any less than that recommended since it would tend to easily tear or rip. Furthermore, the thickness preferably should not exceed that recommended by any substantial amount inasmuch as it would interfere with the flexibility and ease of use of the protective sleeve.

Thus, there has been illustrated and described a unique and novel protective shield for a telephone handset, which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described my invention, what I desire to claim and secure by Letters Patent is:

1. A protective sleeve for disposition over a handset of a telephone to isolate a user of the handset from microbial contamination on the telephone handset without interference with voice communication with the protective sleeve thereon, the protective sleeve comprising:
    a) an elongate protective sleeve for receiving the handgrip of a telephone handset and having a shape generally conforming to that of the handset;
    b) the sleeve also being sized and shaped to generally receive a mouthpiece of the handset and also an earpiece of the handset without any stretching or adjustability to conform to the size and shape of the handset;
    c) the sleeve being formed of a relatively thin-walled material, having a thickness within the range of 0.7 mils to about 0.05 mils, so that the material is capable of being folded or bent with respect to itself, and still being of sufficiently thin-walled construction to allow voice transmission to the mouthpiece of the telephone wherein a material forming the sleeve is impregnated with a microbicide to aid in the destruction of a microbial agent on the handset.

2. The protective sleeve of claim 1 further characterized in that one transverse end of the sleeve is sealed and the opposite transverse end of the sleeve is opened to thereby receive the handset.

3. The protective sleeve of claim 1 in which the sleeve has a generally similar shape throughout its overall length and does not have any enlarged cup-like protrusions thereon.

4. The protective sleeve of claim 1 further characterized in that the area of the sleeve surrounding the mouthpiece is solid but does not prevent any voice communication.

5. The protective sleeve of claim 1 further characterized in that the sleeve has a grid with open spaces facing the mouthpiece of the telephone handset.

6. The protective sleeve of claim 5 further characterized in that the sleeve has a grid of open spaces facing the earpiece of the telephone handset.

7. The telephone handset of claim 1 further characterized in that the handset is capable of being folded with two panels and which have a relatively straight edge on one side and an oppositely disposed arcuately shaped edge on the other.

8. A method of protecting a user of a telephone handset from microbial contamination which may exist on the handset, the method comprising:
    a) impregnating a material used in the formation of a protective sleeve with a microbicide to aid in reduction of any microbial contamination along the telephone handset;
    b) inserting the plastic sleeve over the handset of a telephone and sliding the sleeve along the handset until it completely covers the earpiece and the mouthpiece of that handset, wherein the sleeve is formed of a relatively thin-walled material having a thickness within the range of 0.7 mils to about 0.05 mils;
    c) using the handset by locating the earpiece of the telephone with a protective sleeve thereover at the ear of the user; and
    d) locating a mouthpiece of the handset with the protective sleeve disposed there over so that a user may speak directly into that mouthpiece with the protective sleeve thereon.

9. The method of claim 8 further characterized in that the method comprises disposing of the protective sleeve after use thereof.

10. The method of claim 8 further characterized in that the method comprises providing a plurality of the telephone handset protective sleeves so that a user can purchase same and have them available for use in a small compact package at any desired location.

11. The method of claim 8 further characterized in that the method comprises forming the protective sleeve from a polyethylene material in a molding operation.

* * * * *